United States Patent
Byun et al.

(10) Patent No.: US 12,325,192 B2
(45) Date of Patent: Jun. 10, 2025

(54) PRINTING APPARATUS FOR 3D SURFACE

(71) Applicant: ENJET CO. LTD., Suwon-si (KR)

(72) Inventors: Do Young Byun, Seoul (KR); Shaheer Mohiuddin Khalil, Suwon-si (KR); Vu Dat Nguyen, Suwon-si (KR); Baek Hoon Seong, Hwaseong-si (KR)

(73) Assignee: ENJET CO. LTD., Suwon-si (KR)

( * ) Notice: Subject to any disclaimer, the term of this patent is extended or adjusted under 35 U.S.C. 154(b) by 0 days.

(21) Appl. No.: 18/058,476

(22) Filed: Nov. 23, 2022

(65) Prior Publication Data

US 2024/0131799 A1 Apr. 25, 2024
US 2024/0227305 A9 Jul. 11, 2024

(30) Foreign Application Priority Data

Oct. 24, 2022 (KR) .................. 10-2022-0137229

(51) Int. Cl.
*B29C 64/393* (2017.01)
*B29C 64/118* (2017.01)
(Continued)

(52) U.S. Cl.
CPC .......... *B29C 64/393* (2017.08); *B29C 64/118* (2017.08); *B29C 64/209* (2017.08);
(Continued)

(58) Field of Classification Search
CPC ... B29C 64/386; B29C 64/393; B29C 64/112; B33Y 50/00; B33Y 50/02
See application file for complete search history.

(56) References Cited

U.S. PATENT DOCUMENTS

2017/0266728 A1* 9/2017 Johnson ............... B22D 23/003
2019/0308366 A1* 10/2019 Wang .................... B33Y 30/00
(Continued)

FOREIGN PATENT DOCUMENTS

DE 102020113142 A1 * 11/2021
KR 10-1552433 B1 9/2015
(Continued)

OTHER PUBLICATIONS

Irnstetter, Machine Translation of DE102020113142A1 published Nov. 18, 2021, generated Apr. 3, 2024, Espacenet (Year: 2021).*
(Continued)

*Primary Examiner* — Andrew L Swanson
(74) *Attorney, Agent, or Firm* — Westman, Champlin & Koehler, P.A.

(57) ABSTRACT

Disclosed is a printing apparatus for a 3D surface, which performs printing by ejecting a droplet onto a 3D surface and controlling an electric field on an impact path of the droplet, the printing apparatus including: a ejecting environment information provider configured to provide ejecting environment information between a nozzle and an impact point; and a controller configured to predict a result of printing on an actual substrate by accumulating previous printing results according to printing conditions and the ejecting environment information into a database, and perform the printing on the 3D surface while changing the printing conditions provided by the database based on the ejecting environment information provided by the ejecting environment information provider.

16 Claims, 14 Drawing Sheets

(51) Int. Cl.
*B29C 64/209* (2017.01)
*B33Y 30/00* (2015.01)
*B33Y 50/02* (2015.01)
*G06K 15/02* (2006.01)
*G06K 15/10* (2006.01)
*B29C 64/112* (2017.01)

(52) U.S. Cl.
CPC ............... *B33Y 30/00* (2014.12); *B33Y 50/02* (2014.12); *G06K 15/021* (2013.01); *G06K 15/105* (2013.01); *B29C 64/112* (2017.08)

(56) References Cited

U.S. PATENT DOCUMENTS

| | | | | |
|---|---|---|---|---|
| 2020/0357661 | A1* | 11/2020 | Byun | ................ H01L 21/67126 |
| 2022/0100169 | A1* | 3/2022 | Takakura | ................ B22F 10/80 |
| 2023/0202106 | A1* | 6/2023 | Yarin | .................... B29C 64/112 |
| | | | | 425/174.8 R |

FOREIGN PATENT DOCUMENTS

| | | |
|---|---|---|
| KR | 1020210154202 A | 12/2021 |
| KR | 1020220010395 A | 1/2022 |

OTHER PUBLICATIONS

Office Action in corresponding Korean application No. 10-2022-0137229 dated May 21, 2024.

* cited by examiner (a)

(b)

PRINTING APPARATUS FOR 3D SURFACE

CROSS-REFERENCE TO RELATED APPLICATION

This application claims priority from Korean Patent Application No. 10-2022-0137229, filed on Oct. 24, 2022 in the Korean Intellectual Property Office, the disclosure of which is incorporated herein by reference.

BACKGROUND OF THE INVENTION (a) Field of the Invention

The disclosure relates to a printing apparatus for a three-dimensional (3D) surface, and more particularly to a printing apparatus for a 3D surface, which can perform precise printing on the 3D surface.

(b) Description of the Related Art

In general, an inkjet print head refers to a device that prints an image with predetermined colors on a surface of a printing medium by ejecting fine ink droplet to a desired position on the printing medium. Recently, the applications of the inkjet print head have expanded to various fields such as a liquid crystal display (LCD), an organic light emitting device (OLED) and the like flat panel display fields; electronic (E)-paper and the like flexible display fields; metal wiring and the like printed electronics field; bio fields; and so on.

In a conventional field of inkjet printers, an ink jetting device for jetting ink in the form of droplets has generally used a piezoelectric driving method and a thermal driving method. A printing apparatus using such a driving method provides ejection energy based on mechanical transformation, thereby having an advantage in that it is easy to control a printing job, but having problems in that there are difficulties in implementing ultra fine droplets of several picoliters or less and ejecting ink having high viscosity. Further, droplets ejected from a nozzle by the ejection energy are delivered having only the straightness and thus difficult to be effectively printed on an uneven 3D surface.

Meanwhile, a printing apparatus based on electrohydrodynamics (EHD) provides ejection energy by applying electrostatic force to a liquid surface of ink formed at the end of a nozzle, thereby having advantages in that it is possible to implement ultrafine droplets of several picoliters or less or femtoliters and eject ink droplets having a high viscosity of about 1,000 cPs. Further, the droplets ejected by the force of an electric field are affected by change in their surrounding electric field during flight, and therefore delivered to an impact point as the trajectory of the droplets ejected having the straightness is curved by electric field distribution.

Accordingly, the printing apparatus based on the EHD can more effectively perform printing on a 3D surface than those using the piezoelectric driving method and the thermal driving method. However, even the printing apparatus based on the EHD still has difficulties in performing precise printing on a 3D surface.

When printing is performed on a flat substrate, it is possible to perform precise printing by keeping only a vertical height constant between the substrate and the nozzle. On the other hand, in the case of a 3D surface, the electric field distribution is varied depending on the shape of the surface, and it is therefore impossible to perform precise printing only by keeping a constant distance between the 3D surface and the nozzle.

DOCUMENT OF RELATED ART

Patent Document (Patent document 1) Korean Patent No. 10-1552433

SUMMARY OF THE INVENTION

Accordingly, the disclosure is conceived to solve the foregoing problems, and an aspect of the disclosure is to provide a printing apparatus for a 3D surface, which can perform precise printing on a 3D surface under printing conditions provided by a printing predictive model built by a machine learning technique.

The problems to be solved by the disclosure are not limited to those mentioned above, and other unmentioned problems will become apparent to a person skilled in the art by the following descriptions.

According to an embodiment of the disclosure, there is provided a printing apparatus, which performs printing by ejecting a droplet onto a 3D surface and controlling an electric field on an impact path of the droplet, the printing apparatus including: an ejecting environment information provider configured to provide ejecting environment information between a nozzle and an impact point; and a controller configured to predict a result of printing on an actual substrate by accumulating previous printing results according to printing conditions and the ejecting environment information into a database, and perform the printing on the 3D surface while changing the printing conditions provided by the database based on the ejecting environment information provided by the ejecting environment information provider.

Here, the controller may build a printing predictive model for predicting a result of printing on an actual substrate by machine learning based on the database of the printing conditions and the ejecting environment information, and control printing with the printing conditions provided by the printing predictive model based on the ejecting environment information.

Here, the printing predictive model may obtain the printing conditions in consideration of electric field distribution according to a 3D surface shape around the impact point.

Here, the printing predictive model may be built based on the machine learning by determining the electric field distribution between the nozzle and the impact point in consideration of viscosity of ink, electrical conductivity of ink, the size of the nozzle, and a space information such as a distance between the nozzle and the 3D surface, performing printing by checking a flight trajectory of a droplet according to the quantity of electric charges the droplet has, and comparing the printing with a pattern desired to be finally printed.

Here, the printing apparatus may include an electrohydrodynamic (EHD) printing apparatus or a hybrid printing apparatus using an EHD method.

Here, the printing apparatus may use at least one of a piezoelectric method, a thermal driving method, or a pneumatic method to generate a droplet, and include an electrode to apply voltage and form an electric field on a path between a nozzle tip and an impact point.

Here, the electrode may have at least one of a circular ring shape, a quadrangular shape, or an annular shape separated to surround the nozzle which is formed with a hole through which a droplet ejected from the nozzle passes.

Here, the electrode may be disposed below an end surface of the nozzle.

Here, the electrode may be deposited on an end surface of the nozzle.

Here, the electrode may be disposed inside the nozzle or inside an ink chamber in which ink is stored.

Here, variables for building the printing predictive model by the machine learning may include a value obtained by experiments, or a value obtained by simulation.

Here, variables for building the printing predictive model by the machine learning may include at least one of an input voltage for forming the electric field, an impact point of a droplet according to a 3D shape, an impact path, a distance between a nozzle tip and the impact point, the quantity of electric charges the droplet has, an electric field distribution between the nozzle and the impact point, a material of the impact point, or an ejecting direction of the nozzle.

Here, the printing conditions may include at least one of a voltage level for forming the electric field, a distance between the nozzle and the impact point, an ejecting direction of the nozzle, an ejection speed of the droplet, or the quantity of electric charges the droplet has.

Here, the ejecting environment information provider may include a storage configured to store input information provided by a user, and a sensor configured to detect shape information around the impact point.

Here, the storage may be configured to store 3D shape information or material information about a printing target surface.

Here, the sensor may include an optical unit configured to capture a periphery of the impact point.

Here, the controller may print a 3D structure by repeating printing to form multi-layers.

Here, the controller may perform printing by forming the 3D structure with multi-materials, and changing the printing conditions in consideration of change in the electric field due to the materials.

BRIEF DESCRIPTION OF THE DRAWINGS

The above and/or other aspects of the disclosure will become apparent and more readily appreciated from the following description of the exemplary embodiments, taken in conjunction with the accompanying drawings, in which.

DETAILED DESCRIPTION

Specific features of embodiments are involved in the detailed description and the accompanying drawings.

The merits and features of the disclosure, and methods of achieving them will become apparent with reference to the embodiments described below in detail and the accompanying drawings. However, the disclosure is not limited to the embodiments set forth herein, but may be implemented in various forms. The following embodiments are provided in order to fully describe the disclosure and enable those skilled in the art, to which the disclosure pertains, to understand the disclosure, the scope of which is defined in the appended claims. Like numerals refer to like elements throughout.

Below, a printing apparatus for a 3D surface according to embodiments of the disclosure will be described with reference to the accompanying drawings.

Figure 1:
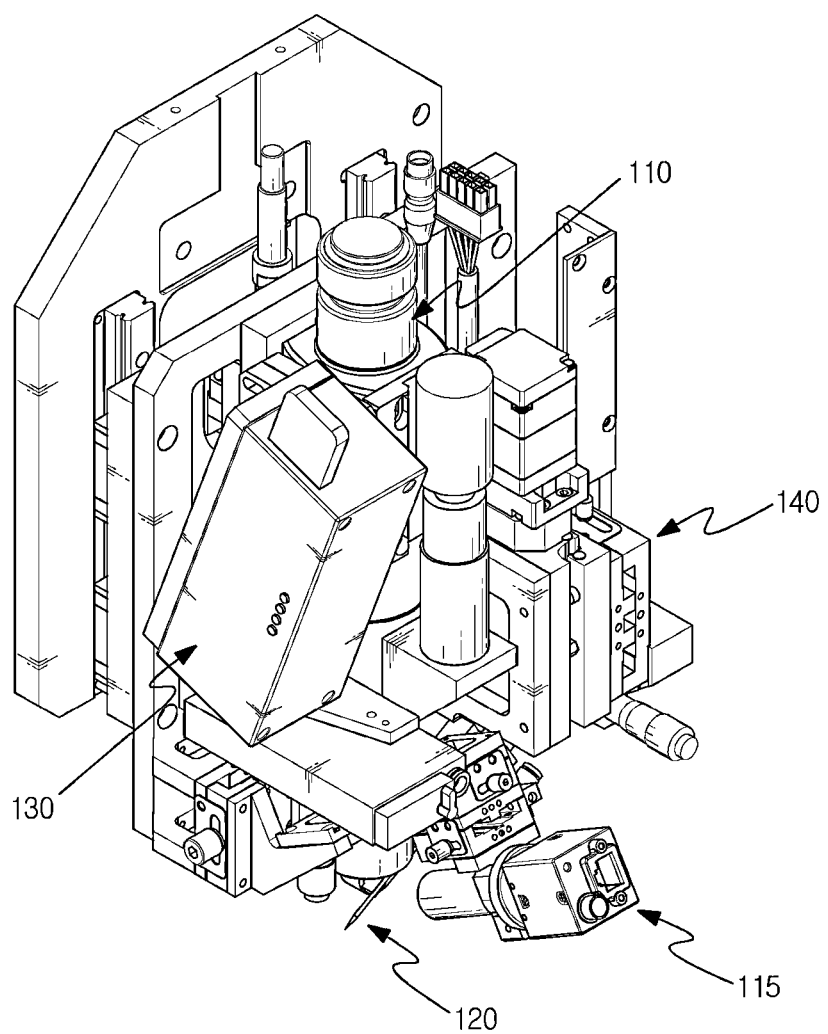
FIGS. 1 and 2 are a perspective view and a lateral view of an electrohydrodynamic (EHD) printing apparatus as an example of a printing apparatus usable in the disclosure.
Figure 2:
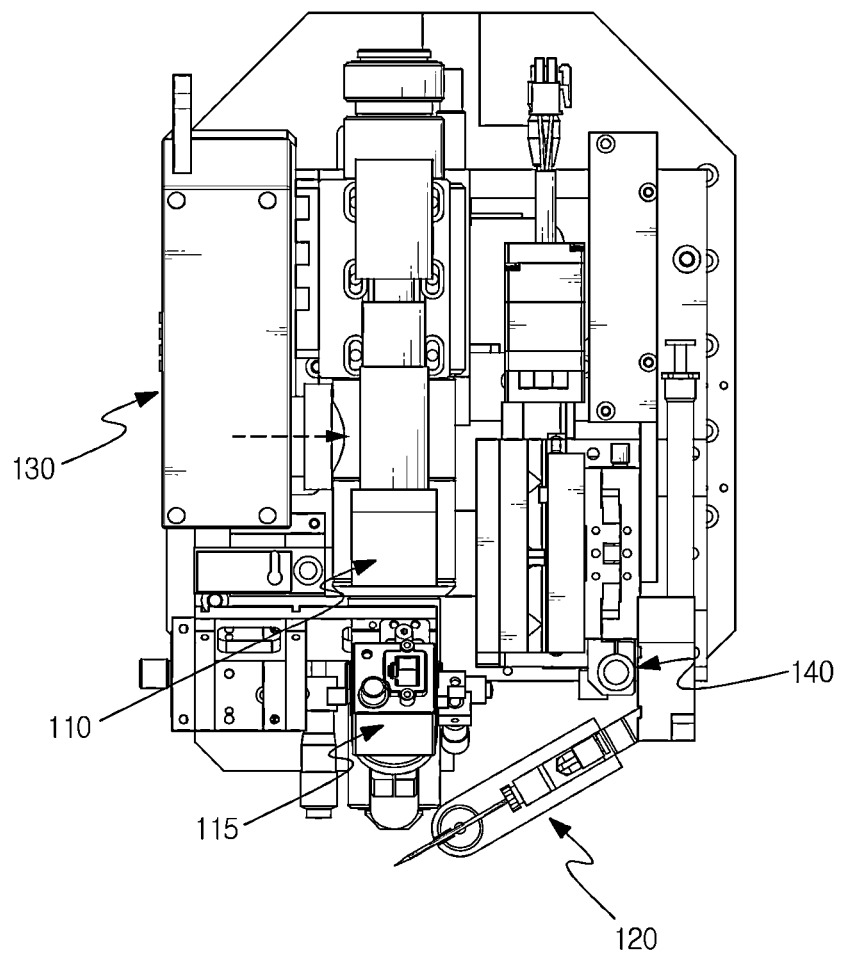
Figure 3:
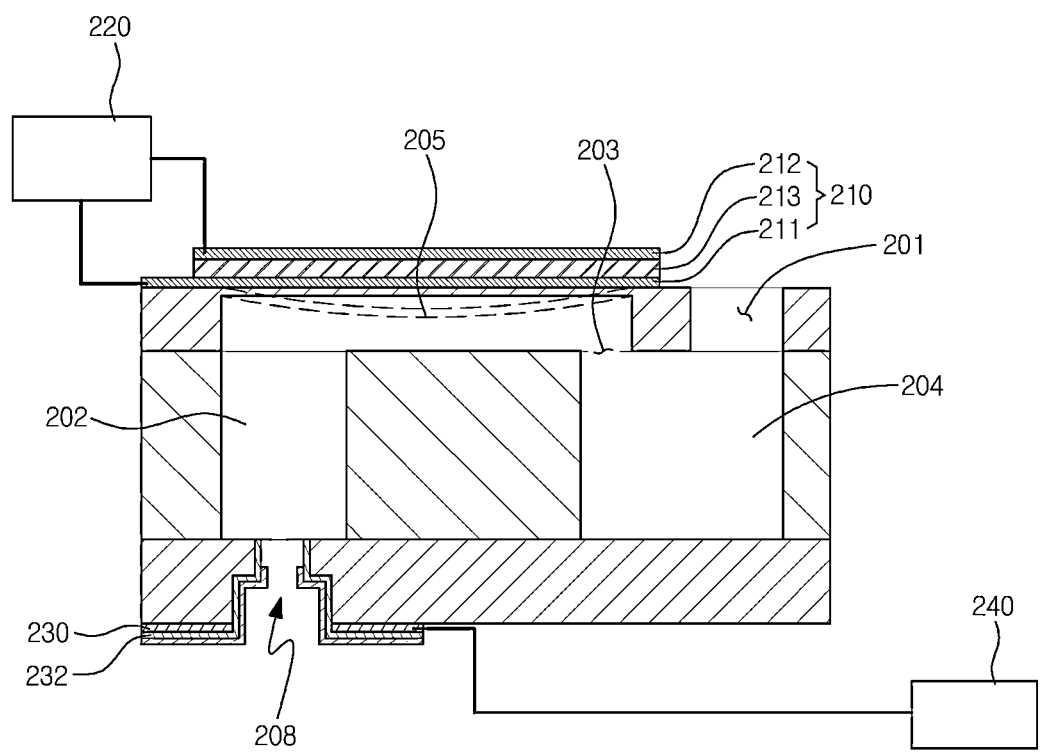
FIG. 3 is a cross-sectional view showing a printing head of a hybrid printing apparatus where a piezoelectric printing apparatus and an EHD printing apparatus are combined as an example of a printing apparatus usable in the disclosure.
Figure 4:
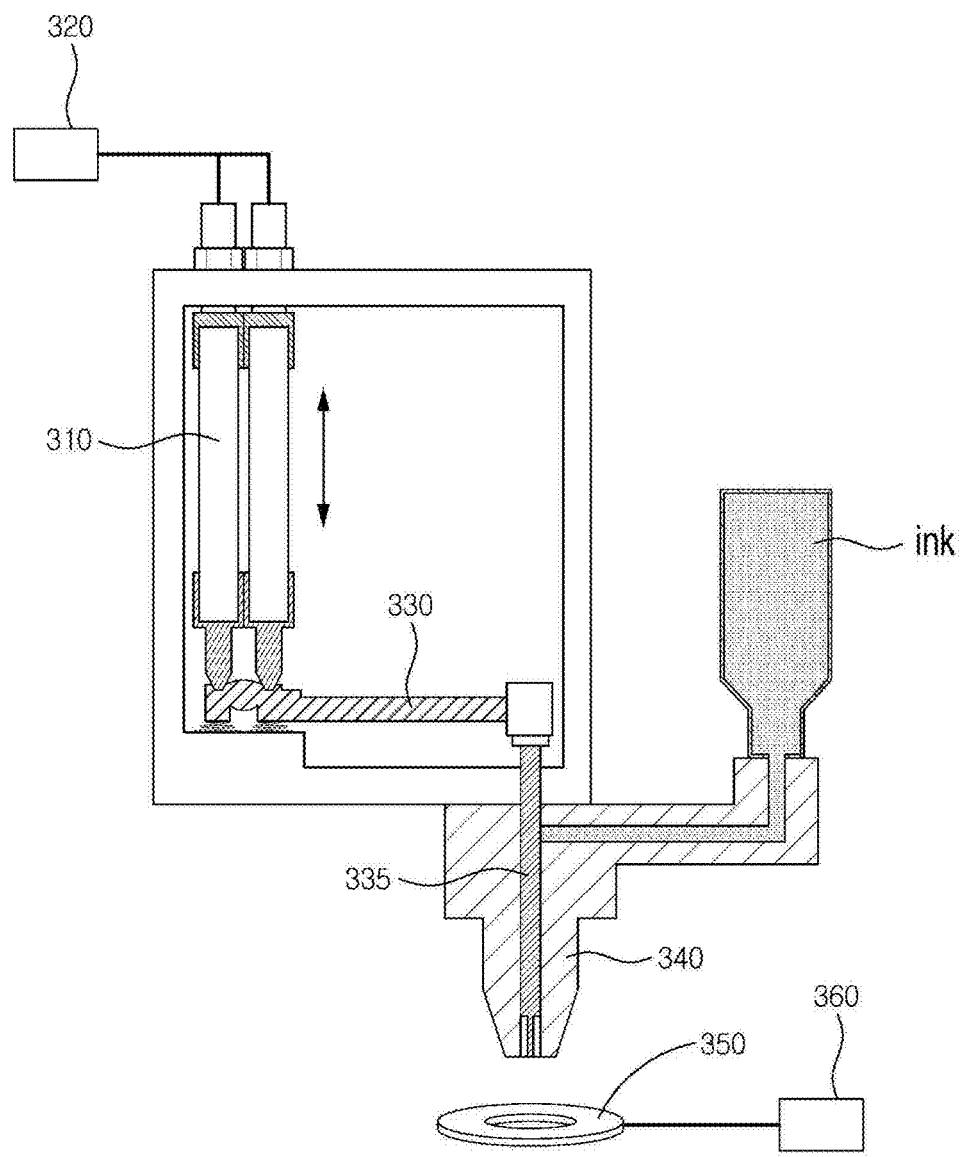
FIG. 4 is a cross-sectional view showing a printing head and an electrode of a piezoelectric printing apparatus as an example of a printing apparatus usable in the disclosure.
Figure 5:
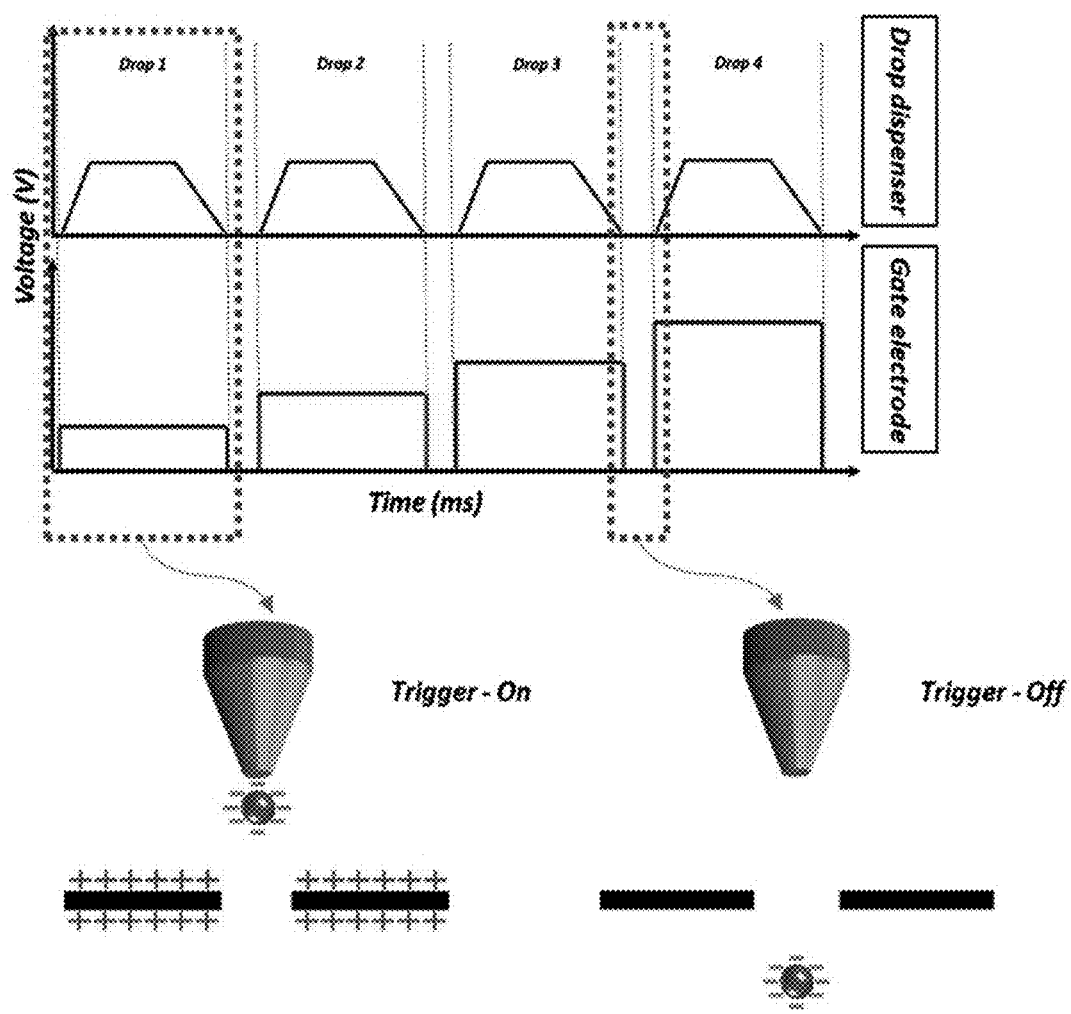
FIG. 5 shows a voltage applied to a piezoelectric device and a voltage applied to an electrode in FIG. 4.
Figure 6:
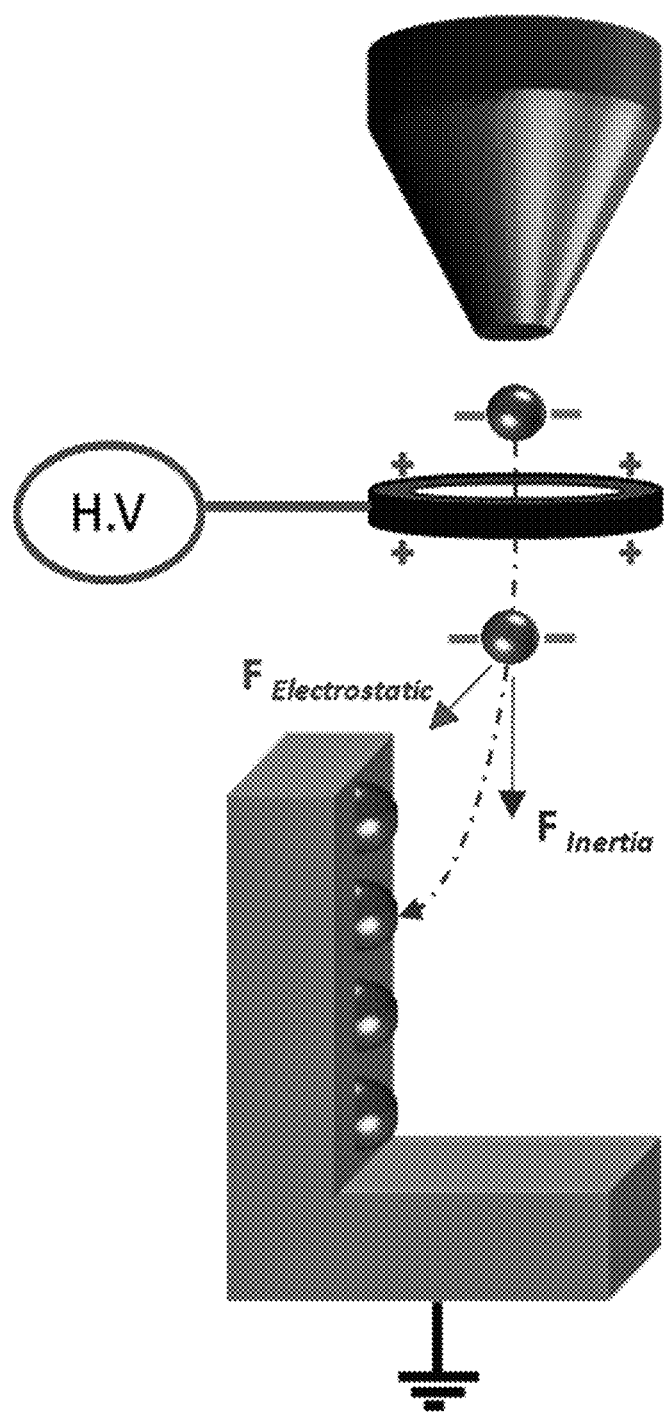
FIG. 6 shows that an impact point on a vertical wall is varied depending on the level of the voltage when the voltage is applied to the electrode in FIG. 5.
Figure 7:
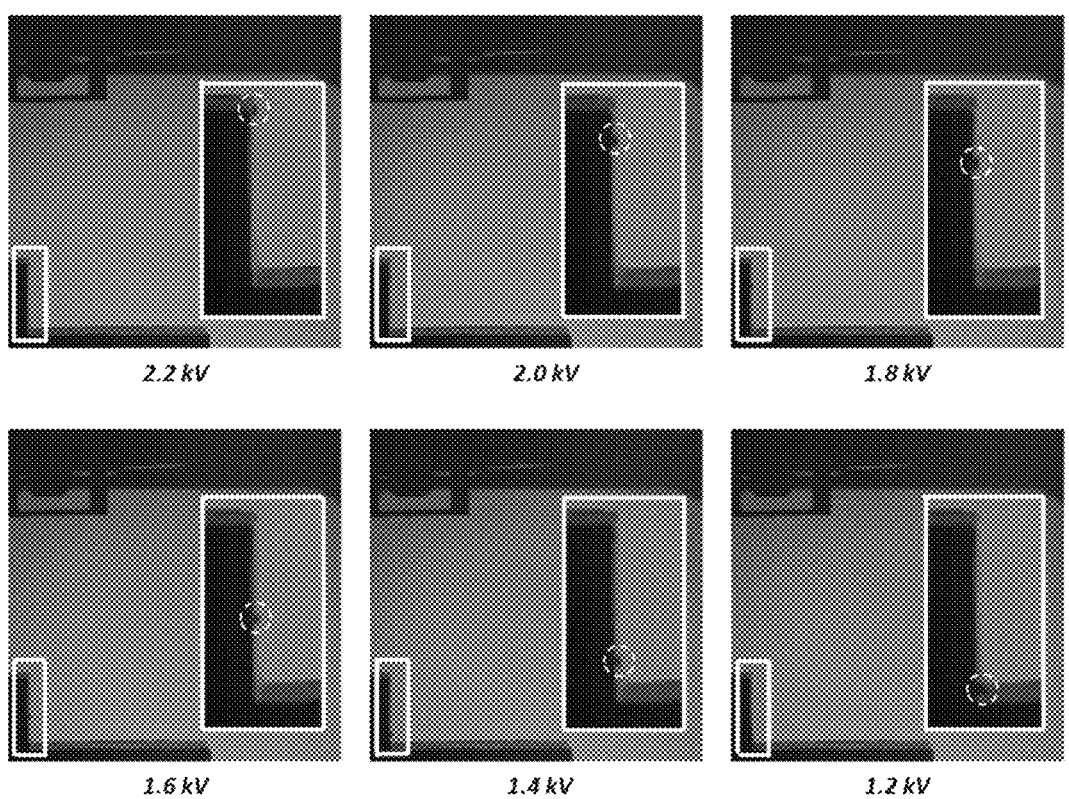
FIG. 7 shows pictures based on actual experiments.

FIGS. 1 and 2 are a perspective view and a lateral view of an electrohydrodynamic (EHD) printing apparatus as an example of a printing apparatus usable in the disclosure, FIG. 3 is a cross-sectional view showing a printing head of a hybrid printing apparatus where a piezoelectric printing apparatus and an EHD printing apparatus are combined as an example of a printing apparatus usable in the disclosure, FIG. 4 is a cross-sectional view showing a printing head and an electrode of a piezoelectric printing apparatus as an example of a printing apparatus usable in the disclosure, FIG. 5 shows a voltage applied to a piezoelectric device and a voltage applied to an electrode in FIG. 4, FIG. 6 shows that an impact point on a vertical wall is varied depending on the level of the voltage when the voltage is applied to the electrode in FIG. 5, and FIG. 7 shows pictures based on actual experiments.

A printing apparatus for a 3D surface according to the disclosure may be configured as a printing apparatus including a printing head that ejects a droplet and changes an impact path of the ejected droplet while controlling an electric field on the impact path.

The printing apparatus for the 3D surface according to the disclosure may for example be configured as a printing apparatus including a printing head that ejects a droplet by an EHD method as shown in FIGS. 1 and 2.

The EHD printing apparatus may include optical units 110 and 115, a nozzle unit 120, a distance measuring sensor unit 130, and a transfer unit 140.

The optical units 110 and 115 capture images of the periphery of a droplet impact point on a substrate. The optical units 110 and 115 may capture enlarged images of the periphery of the droplet impact point on the substrate. For example, the optical units 110 and 115 may be cameras. The images captured by the optical units 110 and 115 may be displayed on a separate display apparatus (not shown). The optical unit 110 may capture an image from vertically above the impact point. Further, the optical unit 115 may be added to capture the periphery of the impact point in an oblique direction from a lateral side.

The nozzle unit 120 ejects a droplet from a nozzle and makes the droplet impact on the substrate. According to an embodiment, the printing apparatus generates and ejects a droplet by the EHD method. Therefore, as is known, the nozzle unit 120 may be internally or externally provided with an electrode to which a high voltage is applied, so that a droplet can be ejected from the tip of the nozzle by an electrostatic force generated when a high voltage is applied to the electrode. In this case, an electric field generated between the nozzle and the substrate may affect flight of the droplet. Thus, it is possible to control the impact path of the droplet by controlling the electric field between the nozzle and the substrate.

The distance measuring sensor unit 130 measures a distance between the nozzle of the printing apparatus and the substrate to be subjected to impact. For example, a laser distance sensor using a laser to measure a distance may be used as the distance measuring sensor unit 130.

The transfer unit 140 transfers the substrate or the nozzle unit 120 while changing a relative position between the substrate and the nozzle by moving the nozzle unit 120 or a stage (not shown), on which the substrate is seated, in X, Y, Z axes. Further, the transfer unit 140 may further include a configuration for adjusting an inclination angle of the nozzle unit 120. As shown in the accompanying drawings, the nozzle unit 120 may be disposed to be inclined, and the inclination angle of the nozzle may be adjusted by the transfer unit 140. Thus, the printing apparatus according to an embodiment can perform more precise printing on a 3D surface. In this case, the angle of the nozzle may be controlled by a controller (to be described later) to have a value provided by the printing predictive model during the printing.

Alternatively, the printing apparatus for the 3D surface the disclosure may be configured as a printing apparatus including a printing head that ejects a droplet by a hybrid method where the EHD method and the piezoelectric method are combined as shown in FIG. 3.

The printing apparatus has the same configuration as that described with reference to FIGS. 1 and 2 except for the printing head, and thus detailed descriptions thereof will be omitted.

The hybrid printing head may include a piezoelectric actuator 210, a first voltage controller 220, an electrode 230 for performing the jetting based on the EHD method, and a second voltage controller 240.

When ink is introduced into a chamber 202 through an inlet 201 and a first voltage controller 210 applies a pulse voltage between a first electrode 211 and a second electrode 212 of the piezoelectric actuator 210, a piezoelectric body 213 is driven to make a membrane 205 above the chamber 202 to vibrate up and down. The vibration of the membrane 205 may cause a pressure wave to be transmitted to the inside of the chamber 202, and the pressure wave may cause a meniscus to become concave or convex at the tip of a nozzle 208 according to negative pressure or positive pressure When the piezoelectric actuator 210 forms the convex meniscus at the tip of the nozzle 208 with the positive pressure of the pressure wave, a droplet may be ejected from the meniscus by an electrostatic force generated by electric charges induced as the second voltage controller 240 applies a high voltage to the electrode 230 coated with an insulator 232. When the membrane 205 is moved up again by the piezoelectric actuator 210 and the chamber 112 is increased in volume, pressure change causes ink stored in a manifold 204 to flow into the chamber 202 through a restrictor 203.

In this way, the printing apparatus including the hybrid printing head generates and ejects a droplet by a combination force of the piezoelectric method and the EHD method. In this case, the printing apparatus according to an embodiment can also control the impact path of the droplet by controlling the electric field between the nozzle and the substrate.

In this case, as described with reference to FIG. 3, not only the hybrid printing apparatus where the piezoelectric method and the EHD method are combined but also another hybrid printing apparatus using the EHD method may be configured as the printing apparatus for the 3D surface according to the disclosure.

The printing apparatus for the 3D surface according to the disclosure may be implemented as another example by being applied to a printing apparatus including a printing head and an electrode 350 to eject a droplet by the piezoelectric method as shown in FIG. 4. The printing apparatus has the same configuration as that described with reference to FIGS. 1 and 2 except the printing head and the electrode 350, and detailed descriptions thereof will be omitted.

In the piezoelectric printing head shown in FIG. 4, when a first voltage controller 320 applies a voltage to a piezoelectric actuator 310, the piezoelectric actuator 310 may be extended or restored to its original state to according to the applied voltage, and a lever 330 hinged to the piezoelectric actuator 310 may rotate with respect to a hinge shaft based on a contact force of the piezoelectric actuator 310 when the piezoelectric actuator 310 moves. When a needle 335 formed at the end of the hinge shaft moves upwards, an ink inlet is opened so that the ink can flow into the nozzle 340. On the other hand, when the needle 335 moves downwards, a droplet is ejected by the pressure applied by the needle 335.

In this case, according to an embodiment, the electrode 350 may be provided so that a second voltage controller 360 can apply a voltage to the electrode 350 to form an electric field on a path between the tip of the nozzle 340 and the impact point. In the embodiment shown in FIGS. 1 to 3, the droplet is generated by the EHD method or the hybrid method using the EHD method. On the other hand, in this embodiment, the droplet is generated by the pressure caused by not the EHD method but the operation of the piezoelectric actuator 310, and the electrode 350 is additionally formed to form the electric field on the impact path of the droplet ejected in a straight direction, thereby controlling the impact path by the electric field generated when the voltage is applied to the electrode 350.

As shown in the drawings, the electrode 350 may be shaped like a circular ring formed with a hole through which the droplet ejected from the nozzle passes. Alternatively, the electrode 350 may be formed having a quadrangular shape with a hole, or an annular shape separated to surround the nozzle.

Further, as shown in the drawings, the electrode 350 may be disposed below the end surface of the nozzle, or may be deposited on the end surface of the nozzle. Alternatively, the electrode may be disposed surrounding the nozzle.

Further, the electrode 350 may be disposed inside the nozzle or inside an ink chamber (not shown) in which ink is stored, and perform a function of charging the droplet as well as a function of forming the electric field.

As shown in FIG. 5, the droplets may be generated by periodically applying voltages to the piezoelectric actuator 310. When the voltages of different levels for the generated droplets are applied to the electrode 350, as shown in FIGS. 6 and 7, the electric field affecting the ejected droplets is varied in strength depending on the levels of the voltages applied to the electrode 350 and thus the degrees of bending the impact path of the droplets flying toward an object protruding like a bar in a vertical direction are different so that the droplets can impact on different vertical positions of the object. When a voltage having a predetermined level is applied to the electrode 350, predetermined distribution of the electric field is formed between the nozzle 340 and the object according to the shape of the object, and the strength of the electric field is varied depending on the level of the voltage applied to the electrode 350. Therefore, the higher the voltage applied to the electrode 350, the stronger the electric field, thereby having a greater effect on the flight of the droplet. When the voltage applied to the electrode 350 has a higher level, the degree of bending the impact path of the droplet increases and the droplet impacts on an upper position of the object protruding like a bar in the vertical direction. On the other hand, when the voltage having a lower level, the bending degree decreases and the droplet impacts on a lower position of the object.

In this case, according to an embodiment, it has been described above by way of example that the piezoelectric actuator 310 is used to generate the droplet. However, the printing apparatus for the 3D surface according to the disclosure may be configured as a printing apparatus in which the electrode 350 is formed in an inkjet head based on the known thermal driving method or pneumatic driving method.

As described above with reference to FIGS. 1 to 7, the printing apparatus for the 3D surface according to the disclosure may be configured as the printing apparatus that performs printing by ejecting the droplets and controlling the electric field on the impact path, which may include the EHD printing apparatus, the hybrid printing apparatus using the EHD method, or the printing apparatus formed with the electrode 350 on the flight path of the droplet ejected by a method other than the EHD method.

Figure 8:
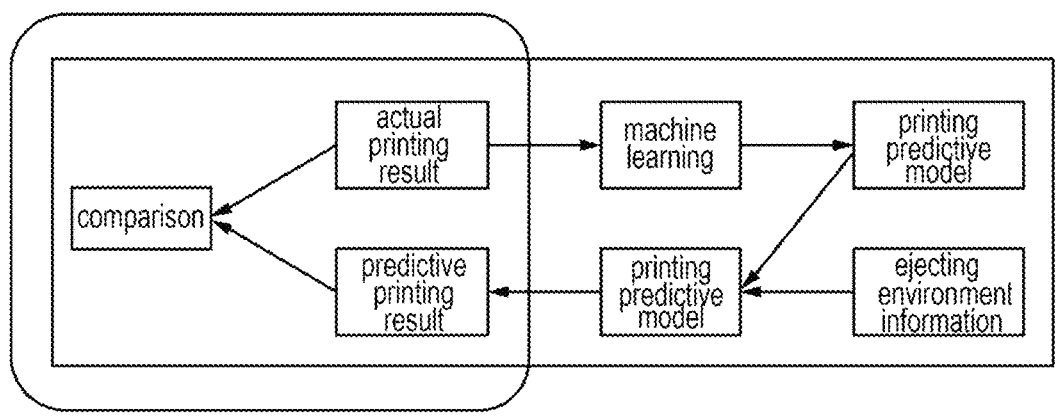
FIG. 8 shows a process of building a printing predictive model according to the disclosure and a result of comparison between a printing result predicted by a printing predictive model and an actually measured printing result.
Figure 8:
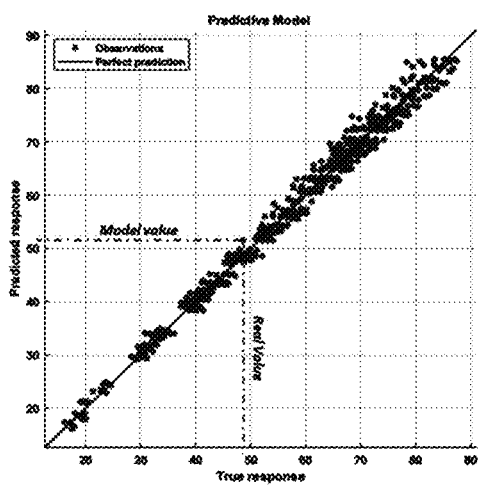
Figure 8:
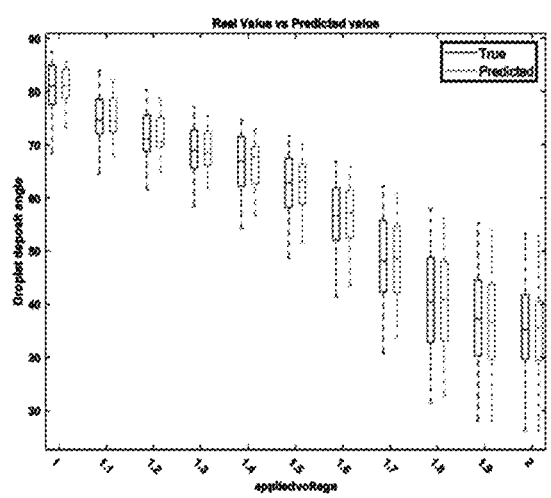
Figure 9:
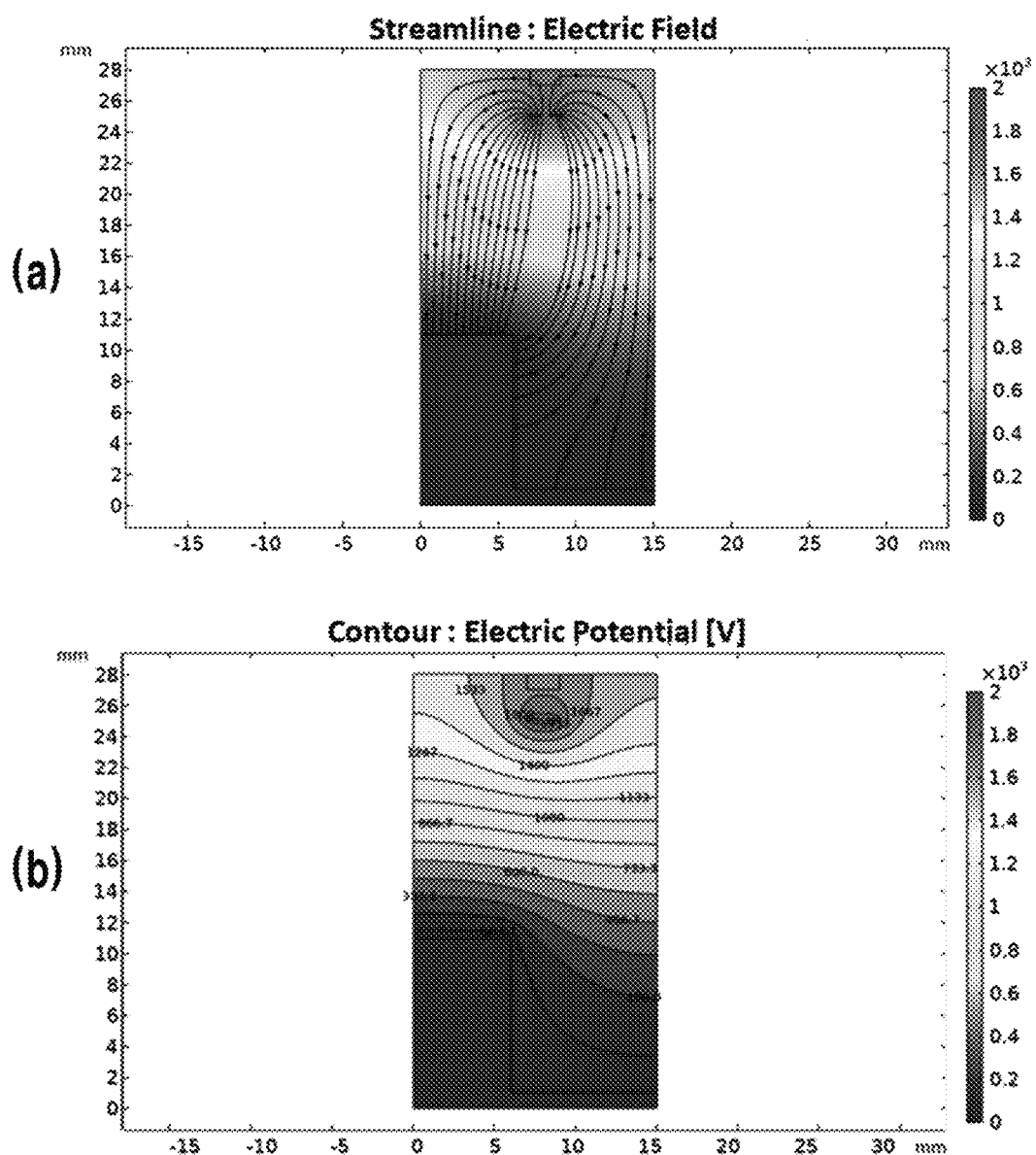
FIG. 9 shows distribution results (streamline and contour) of an electric field based on simulation in a printing predictive model according to the disclosure.
Figure 10:
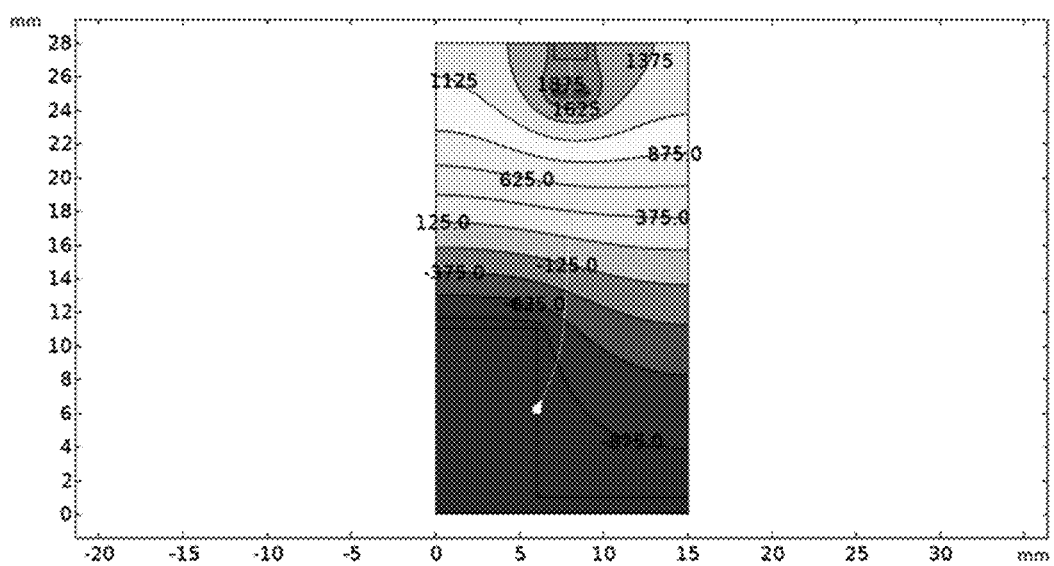
FIG. 10 shows a simulation result of an impact path of a droplet with respect to the electric field distribution of FIG. 9.
Figure 11:
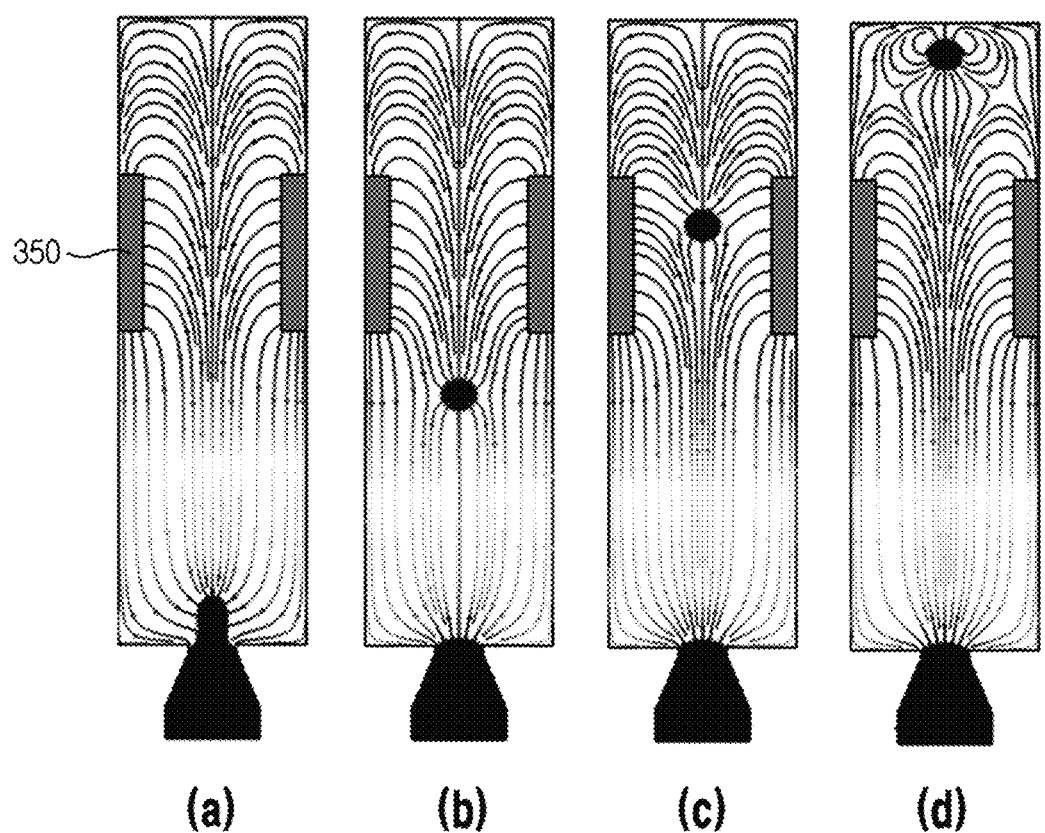
FIG. 11 shows simulation of change in electric field distribution according to the positions of a droplet when the droplet is ejected from a nozzle and a voltage is applied to an electrode according to the disclosure.
Figure 12:
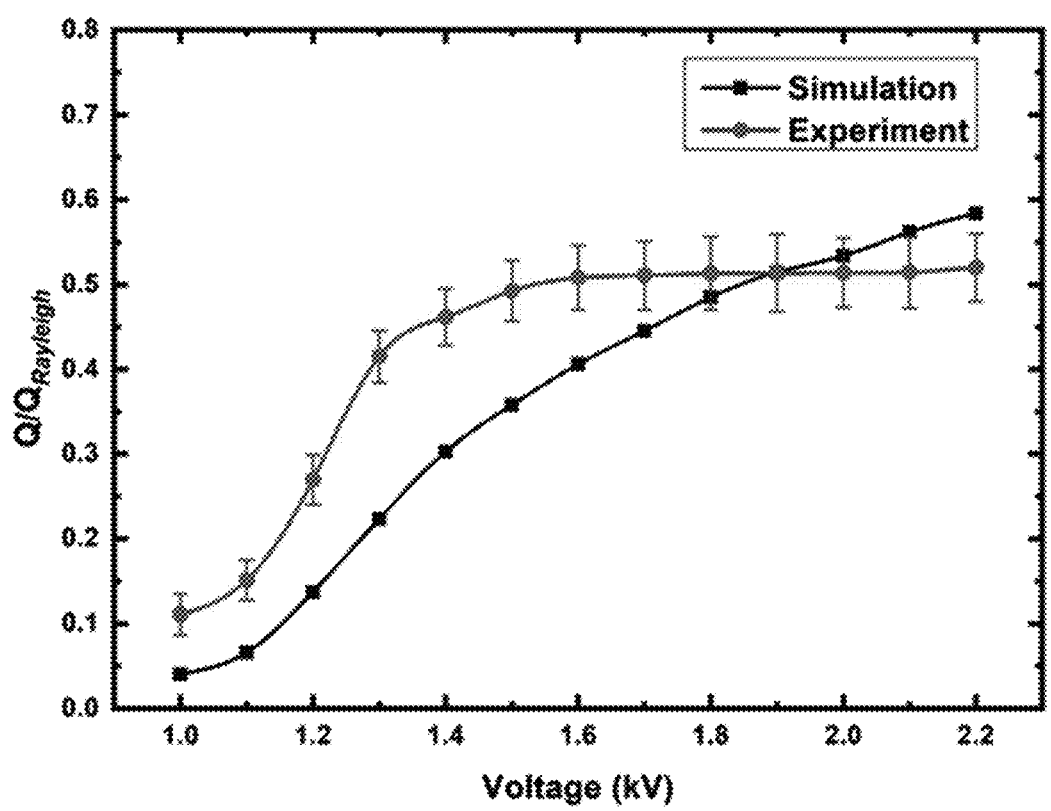
FIG. 12 is a graph showing comparison in the quantity of electric charge between a droplet based on the simulation of FIG. 11 and a droplet based on actual experiment.
Figure 13:
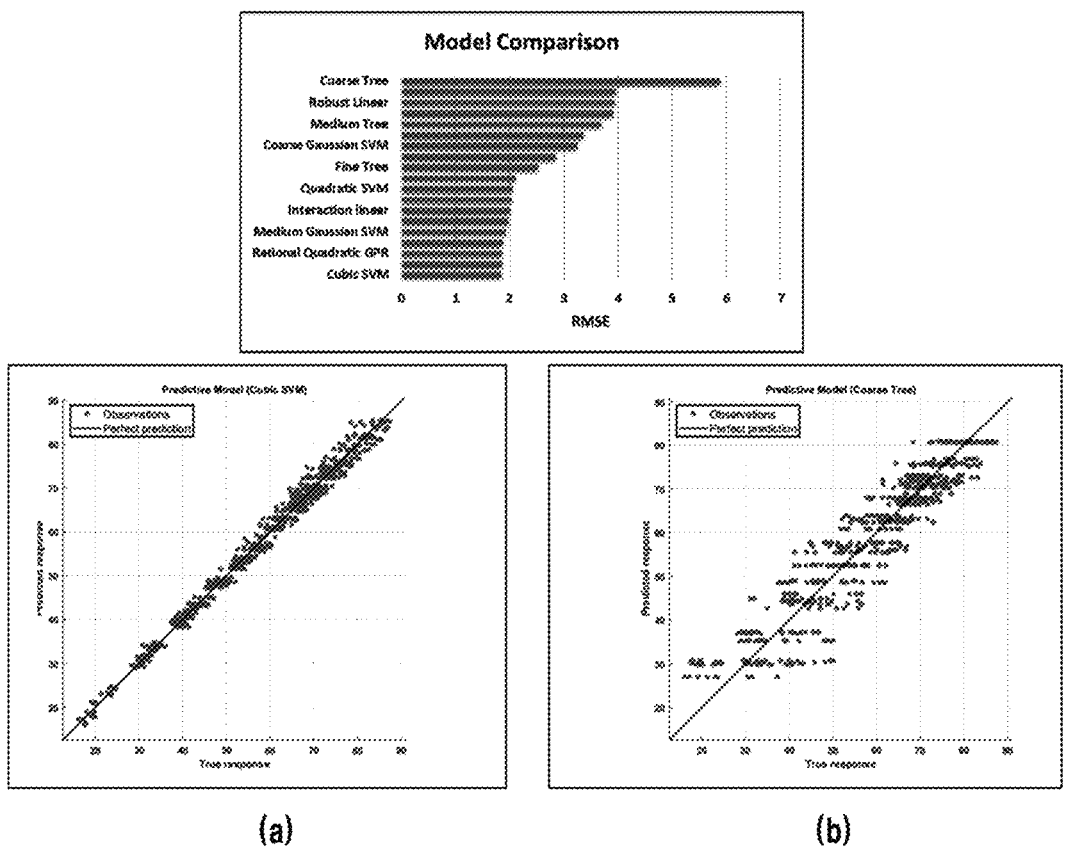
FIG. 13 shows various machine learning algorithms used in a printing predictive model and prediction results thereof.
Figure 14:
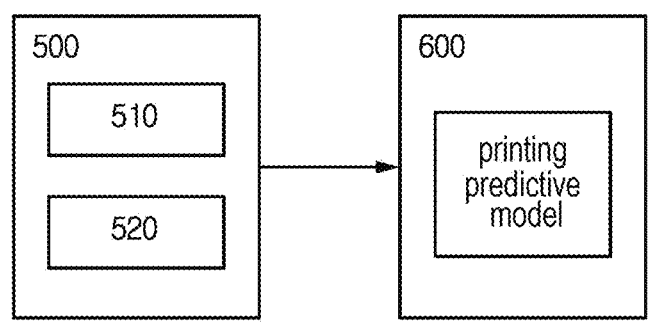
FIG. 14 shows a printing apparatus for the 3D surface according to an embodiment of the disclosure.

FIG. 8 shows a process of building a printing predictive model according to the disclosure and a result of comparison between a printing result predicted by a printing predictive model and an actually measured printing result; FIG. 9 shows distribution results (streamline and contour) of an electric field based on simulation in a printing predictive model according to the disclosure; FIG. 10 shows a simulation result of an impact path of a droplet with respect to the electric field distribution of FIG. 9; FIG. 11 shows simulation of change in electric field distribution according to the positions of a droplet when the droplet is ejected from a nozzle and a voltage is applied to an electrode according to the disclosure; FIG. 12 is a graph showing comparison in the quantity of electric charge between a droplet based on the simulation of FIG. 11 and a droplet based on actual experiment; FIG. 13 shows various machine learning algorithms used in a printing predictive model and prediction results thereof; and FIG. 14 shows a printing apparatus for the 3D surface according to an embodiment of the disclosure.

The printing apparatus for the 3D surface according to the disclosure refers to a printing apparatus that can eject a droplet and control an impact path of the ejected droplet while controlling the electric field on the impact path, and may be configured by adding an ejecting environment information provider 500 and a controller 600 to the printing apparatus described with reference to FIGS. 1 to 7.

The ejecting environment information provider 500 may provide information about the nozzle of the foregoing printing apparatus to the impact point of the ejected droplet. Here, the information about the nozzle to the impact point may include information about the nozzle (for example, the size of the nozzle), information about the impact point (for example, the material of the impact point), and information about a space between the impact point and the nozzle (for example, a 3D space around the impact point). The ejecting environment information provider 500 may include a storage 510 and a sensor 520.

The storage 510 is the same as a storage device of a computer, and stores data by a worker. The printing apparatus for the 3D surface according to the disclosure may perform printing on a horizontal surface, but may perform printing on an uneven 3D surface. For performing the printing on the uneven 3D surface, 3D shape information about a printing target surface is required. Thus, the storage 510 may be configured to store the 3D shape information about the printing target surface in the form of a 3D file. Accordingly, when the nozzle moves or the stage on which the substrate is seated moves, a 3D shape of the substrate around a point where the nozzle is positioned is determined by determining a relative position of the nozzle to the substrate with respect to a reference position Further, the storage 510 may be configured to store information about the material of the impact point. The material information may be varied depending on the positions of the substrate. When a voltage is applied to an electrode for EHD ejecting to form the electric field or to the electrode 350, the electric field distribution may be varied depending on the materials of the substrate. A printing predictive model of the controller 600 (to be described later) reflects the material information about the impact point to increase a prediction accuracy of the printing predictive model, thereby more precisely printing the droplets on the 3D surface.

Further, the storage 510 may also be configured to store information about the viscosity of ink, the electrical conductivity of ink, and the size of the nozzle.

The sensor 520 may be configured to measure shape information around the impact point on which the droplet ejected from the nozzle impacts. The sensor 520 may include the optical units 110 and 115 to capture images of the periphery of the impact point. Further, the sensor 520 may further include the distance measuring sensor unit 130 to measure a distance between the nozzle and the impact point.

In this way, the information provided by the ejecting environment information provider 500 may include information previously stored in the storage 510 by a user or information determined in real time by the sensor 520. The ejecting environment information provider 500 may provide ejecting environment information such as the 3D shape information of the impact point, the material of the impact point, the distance between the nozzle and the impact point, the viscosity of ink, the characteristic information about ink including the electrical conductivity of ink, and the size of the nozzle to the controller 600.

The controller 600 may predict a result of printing on an actual substrate by accumulating previous printing results according to the printing conditions and the ejecting environment information into a database. Therefore, when the printing is performed, printing conditions are changed into optimal printing conditions provided by the database in response to an input of the ejecting environment information provided by the ejecting environment information provider 500, thereby performing the printing on the 3D surface.

In more detail, the controller 600 includes the printing predictive model built by a machine learning technique based on results of printing with various pieces of ejecting environment information and under various printing conditions. The controller 600 performs the printing while changing the printing conditions according to the locations of the nozzle into the printing conditions provided by the printing predictive model based on the ejecting environment information provided by the ejecting environment information provider 500 with respect to a point where the nozzle is currently located.

In the case of the 3D surface, the distribution of the electric field is varied depending on the shapes of the surface, and therefore only keeping a distance between the 3D surface and the nozzle constant is not enough to perform the precise printing. Thus, according to the disclosure, the printing is performed while controlling the printing conditions by determining the electric field distribution between the nozzle and the impact point according to structural shapes around the impact point.

Thus, the results of printing with various pieces of ejecting environment information and under various printing conditions are built into the printing predictive model by the machine learning technique, and the printing predictive model obtains the optimal printing conditions in response to an input of the ejecting environment information provided by the ejecting environment information provider 500 at the current location of the nozzle, thereby performing the printing under the obtained optimal printing conditions.

In more detail, the printing predictive model may be built by determining the electric field distribution between the nozzle and the impact point in consideration of the viscosity of ink, the electrical conductivity of ink, the size of the nozzle, and the space information about the periphery of the impact point including the distance between the nozzle and the 3D surface, performing the printing by obtaining a flight trajectory of a droplet according to the quantity of electric charges of the droplet based on the electric field distribution, and comparing the performed printing with a pattern desired to be finally printed.

Here, the printing conditions may include at least one of the level of voltage for forming an electric field, an ejecting direction of the nozzle, a distance between the nozzle and the impact point, an ejecting speed of a droplet, and the quantity of electric charge the droplet has.

In FIG. 8, an upper part shows that the printing predictive model is built by the machine learning technique. The printing result predicted under the printing conditions provided by the printing predictive model based on an input of the ejecting environment information about the periphery of the impact point provided by the ejecting environment information provider 500 is compared with the result of actual printing under the same printing conditions, and reflected in a machine learning algorithm to update the printing predictive model. By repeating this learning process, the printing predictive model having a high accuracy may be built with respect to various pieces of ejecting environment information.

Variables for building the printing predictive model by the machine learning technique may include at least one of an input voltage (level) for forming an electric field, an impact point of a droplet according to a 3D surface shape, an impact path, a distance between the tip of the nozzle and the impact point, the quantity of electric charges the droplet has, an electric field distribution between the nozzle and the impact point, the material of the impact point, the viscosity of ink, the electrical conductivity of ink, and the size of the nozzle.

In this case, the variables may be actual values obtained by experiments, or a value obtained by simulation based on computational analysis. For example, the electric field distribution according to the disclosure may be obtained by the simulation.

Regarding two phase flow, the following equations may be used to obtain the electric field distribution and the impact path through the simulation.

Electric Field Equations $$E = -\nabla V$$

$$E = iE_x + jE_y + kE_z$$

$$E = -\left(\frac{\partial V}{\partial x}i + \frac{\partial V}{\partial y}j + \frac{\partial V}{\partial x}k\right)$$

where, E is the electric field (V/m)→negative divergence of voltage, and V is a voltage (V).

Charged Particle Equations $$\frac{d(m_p v)}{dt} = F$$

$$F = qE$$

$$E = -\left(\frac{\partial V}{\partial x}i + \frac{\partial V}{\partial y}j + \frac{\partial V}{\partial x}k\right)$$

where, $m_p$ is the mass (kg) of a particle, v is the velocity (m/s) of the particle, t is time (s), F is a force (N or kg·m/s$^2$), and q is the quantity (C) of electric charges the droplet has.

Navier Stokes Equation $$\rho\left(\frac{\partial u}{\partial t} + (u.\nabla)\right) = -\nabla p + \nabla.\left(\mu(\nabla u + (\nabla u)^T) - \frac{2}{3}\mu(\nabla.u)I\right) + F$$

where, u is the velocity [m/s], $\rho$ is the density (kg/m$^3$), $\mu$ is the dynamic viscosity (Pa/s), p is pressure (Pa), g is the gravitational acceleration (m/s$^2$), and F is the electrostatic volume force (N/m$^3$).

Continuity Equation $$\frac{\partial \rho}{\partial t} + \nabla.(\rho u) = 0$$

where, $\rho$ is the density (kg/m$^3$), t is time (s), and u is the velocity (m/s).

Maxwell Stress Tensor Equation $$F = \nabla.T \qquad E = -\nabla V$$

$$T = ED^T - \frac{1}{2}(E, D) \quad D = \varepsilon_0 \varepsilon_T E$$

$$T = \begin{bmatrix} T_{xx} & T_{xy} \\ T_{yx} & T_{yy} \end{bmatrix} = \begin{bmatrix} \varepsilon_0\varepsilon_r E_x^2 - \frac{1}{2}\varepsilon_0\varepsilon_r(E_x^2 + E_y^2) & \varepsilon_0\varepsilon_r E_x E_y \\ \varepsilon_0\varepsilon_r E_y E_x & \varepsilon_0\varepsilon_r E_y^2 - \frac{1}{2}\varepsilon_0\varepsilon_r(E_x^2 + E_y^2) \end{bmatrix}$$

where, F is the electrostatic volume force (N/m$^3$), T is the Maxwell electrical stress tensor (Pa), E is the electric field (V/m), V is the voltage (V), D is the electrical displacement field (C/m$^2$), $\varepsilon_0$ is the permittivity of vacuum (F/m), and $\varepsilon_r$ is the relative permittivity of fluid volume fraction.

FIG. 9 shows a simulation result of the electric field distribution according to the disclosure when an electric field is applied to the nozzle located at a side above a vertical wall. As shown therein, the electric field was not uniformly and symmetrically distributed but asymmetric electric field distribution was formed due to a 3D structure. In this case, it was predicted that only the strength of the electric field increased without changing the distribution of the electric field even though the level of the applied voltage become higher.

FIG. 10 shows a simulation result of an impact path when a charged droplet is ejected from the nozzle in the electric field distribution of FIG. 9. The droplet ejected from the nozzle did not form a vertically downward impact path but its impact path was bent toward the vertical wall due to the electric field distribution while making the droplet impact on the lateral side of the wall.

FIG. 11 shows a simulation result of an electric field varied depending on the positions of a droplet when the droplet is ejected from the nozzle and a voltage is applied to the electrode 350. Through the simulation result, it was confirmed that the electric field distribution was varied depending on the positions of the droplet.

Further, FIG. 12 shows a simulation result of the quantity of electric charges a droplet has due to the electrode when the droplet is ejected and flown as shown in FIG. 11, together with an actually measured result. It was confirmed that the quantity of electric charges the droplet has based on the simulation followed the actually measured quantity of electric charges the droplet has according to the levels of voltage applied to the electrode.

When the printing predictive model is built by the machine learning as shown in FIG. 13, various known algorithms may be used.

The machine learning is in a field of artificial intelligence in a computer science, which has evolved from the research of pattern recognition and computer learning theory. The machine learning refers to technology of studying and building a system for improving its own performance by performing learning and prediction based on empirical data, and an algorithm for the system. The algorithm of the machine learning takes a method of building a specific model to make predictions or decisions based on input data, rather than carrying out strictly defined static program instructions.

The techniques and models of the machine learning include a decision tree that uses a tree structure as a prediction model, a neural network that mimics the structure and function of an organism's neural network, genetic programming that is based on an evolutionary algorithm of organisms, clustering that distributes observed examples into subsets called clusters, a Monte Carlo method that calculates a function value based on probability with randomly extracted random numbers, etc.

The decision tree refers to tree branches formed by schematizing a situation that various outcomes are possible according to which alternative will be selected and which of uncertain situations that may occur is realized. The elements that constitute the decision tree include uncertain situations and alternatives as the skeleton of the decision tree, benefits and losses as outcomes, and probabilities of outcomes and uncertain situations. These elements are combined into decision points and uncertain points, and constitute the decision tree.

The artificial neural network, also called neurons, is based on the idea of actively mimicking the functions of a human brain. That is, the artificial neural network is to train a computer for a way of thinking that sees something, recognizes what it is, and takes action as necessary, which are very simple and natural for a human. In other words, the artificial neural network refers to a method of setting a plurality of factors (or parameters) related to a control target, and thinking about combination of the factors and the weight of the combination. By adding a learning function to a calculation process, optimal control is possible.

The genetic programming is based on the genetics in nature, and in particular Darwin's theory of natural selection as basic concept. In the genetic programming, possible solutions to a problem are listed, and then genes are gradually modified to obtain more accurate and better solutions. Here, the solutions to the problem are called the genes, and the modification of such genes to obtain better solutions is regarded as evolution. In other words, the genetic programming may also be said to be a search algorithm that mimics the evolution to find better solutions.

The clustering is to form clusters so that similarity between data that belong to the same cluster can be higher on average than similarity between data that do not belong to the same cluster. The similarity refers to similar values of data measured using a distance or the like between clusters when data values are classified into several clusters. For example, the similarity may be determined based on a Euclidean distance in which data is expressed as points on coordinates and a distance between the points are obtained. Other methods of measuring the similarity include cosine similarity (i.e., an angle between two objects) that classifies data into clusters and obtains an angle between clusters, a correlation coefficient that compares clusters to express a relationship with a value between −1 and 1, etc. The clustering is generally used in an unsupervised machine learning in the field of machine learning, and utilized in extracting useful knowledge from data by clustering similar data. As representative clustering methods, there are 'hierarchical clustering' and 'k-means clustering.' The hierarchical clustering refers to a stepwise method of constructing clusters from the case where all objects are included in on cluster to the case where the objects respectively constitute the clusters. This method includes a bottom-up method and a top-down method. The k-means clustering refers to a method of previously determining the number of clusters, 'k,' by a user, and obtains various results according to initialization states.

The clustering may be variously applied in numerous fields such as communication, medicine, biology, business administration, marketing, search engines, etc. For example, in a communication system, the clustering may be used as technology for classifying and controlling the terminals close to each other into clusters based on data of a distance between the terminal and a base station. In particular, the clustering is used as technology for efficiently allocating frequencies and resources in an area where the terminals are densely populated. In the medicine, the clustering is used for disease classification technology, gene expression information analysis, etc. through cluster classification of medical image data.

The Monte Carlo method uses a random number generator of a computer in terms of solving mathematical problems. Monte Carlo is a European city famous for its casinos. The name of this method, Monte Carlo, comes from the association between casino games and probability mechanisms. In the Monte Carlo method, a basic element is a uniform random number. Independent random numbers u1, u2, . . . , un, which follow a uniform distribution between 0 and 1, are created by a computer algorithm (or a physical mechanism such as a rotating disc) and utilized.

In FIG. 13, (a) and (b) show prediction results and actual results based on different machine learning algorithms, among which an algorithm (a) at the left side having the smallest deviation (root mean square error, RMSE) between the prediction results and the actual results is selected and used as the printing predictive model.

The printing apparatus for the 3D surface according to the disclosure may further include a curing unit to cure the impact point by emitting a laser or the like energy to the impact point. When a droplet impacts a position having a steep slope, the droplet may flow down along the slope. The curing unit immediately cures the droplet and prevents the droplet from flowing down. Further, according to the disclosure, the amount of energy emitted from the curing unit may be differently controlled according to the angles of slope based on the stored 3D shape information. For example, the curing unit may emit a relatively large amount of energy to the impact point when the slope at the impact point is steep, but may emit a relatively small amount of energy to the impact point when the slope at the impact point is gentle.

The controller 600 of the printing apparatus according to the disclosure may reflect the printing conditions of the printing predictive model in real time based on the ejecting environment information provided in real time by the ejecting environment information provider 500 while moving the nozzle to perform the printing on the 3D surface.

In addition, according to the disclosure, it is possible to print a 3D structure on the 3D surface. By determining the 3D structure as a continuously stacked structure as the existing 3D printer does, the controller 600 may print the 3D structure by repeating the printing to form multi-layers.

As the printing is repeated to form the multi-layers, the space information between the nozzle and the impact point is changed. According to the disclosure, the printing conditions may be changed as the stacking is repeated.

In the existing 3D the printing apparatus, the printing is performed keeping only a constant distance between the nozzle and the impact point when the stacking is repeated. However, according to the disclosure, when a 3D structure is printed by repeating the printing, the printing is performed while changing the printing conditions by reflecting the space information changed during a stacking process, thereby more precisely printing the 3D structure.

Further, in a 3D printing apparatus for multi-materials, a structure of different materials is formed as the stacking is repeated, and may affect the distribution of the electric field. Even in this case, the machine learning based on the artificial intelligence and the database according to the disclosure may be used for more precise 3D printing.

As described above, the printing apparatus for the 3D surface according to the disclosure performs printing based on the printing conditions provided by the printing predictive model built by the machine learning technique, thereby having an advantage of precisely performing the printing even on a 3D surface.

Although detailed embodiments of a fluidic lens with a variable focal length according to the disclosure have been described, the disclosure is not limited to such detailed embodiments. Various changes and modifications can be made by a person having ordinary knowledge in the art without departing from the spirit and scope of the invention defined in the appended claims.

REFERENCE NUMERALS

| | |
|---|---|
| 110, 115: optical unit | 120: nozzle unit |
| 130: distance measuring sensor unit | |
| 140: transfer unit | 201: inlet |
| 202: chamber | 203: restrictor |
| 204: manifold | 205: membrane |
| 208: nozzle | 210: piezoelectric actuator |
| 211: first electrode | 212: second electrode |
| 220: first voltage controller | 230: electrode |
| 232: insulator | 240: second voltage controller |
| 310: piezoelectric actuator | 320: first voltage controller |
| 330: lever | 335: needle |
| 340: nozzle | 350: electrode |
| 360: second voltage controller | |
| 500: ejecting environment information provider | |
| 510: storage | 520: sensor |
| 600: controller | |

What is claimed is:

1. A printing apparatus, which performs printing by ejecting a droplet onto a three-dimensional (3D) surface and controlling an electric field on an impact path of the droplet and comprises an electrode to apply voltage to form an electric field on a path between a nozzle and an impact point, the printing apparatus comprising:

an ejecting environment information provider configured to provide an ejecting environment information affecting the distribution of the electric field between the nozzle and the impact point, wherein the ejecting environment information includes a 3D surface shape around the impact point, wherein the ejecting environment information provider comprises any one of a storage configured to store the ejecting environment information provided by a user and a sensor configured to detect the ejecting environment information; and a controller including a printing predictive model that accumulates previous printing results of one or more previously ejected droplets according to printing conditions and the ejecting environment information into a database and predicts a printing result of the droplet according to the printing conditions and the ejecting environment information based on the database, wherein the controller is configured to control the ejecting of the droplet through the nozzle while changing in real time the printing conditions provided by the printing predictive model based on the ejecting environment information provided by the ejecting environment information provider with respect to a point where the nozzle is currently located, wherein the printing conditions comprise a voltage level applied in the electrode for forming the electric field, wherein the voltage applied in the electrode for forming the electric field is controlled to produce a controlled amount of bending of the impact path of the droplet in order to direct the droplet to the impact point, and wherein the printing predictive model obtains the printing conditions in consideration of change in electric field distribution according to the 3D surface shape around the impact point.

2. The printing apparatus of claim 1, wherein the printing predictive model is built based on machine learning.

3. The printing apparatus of claim 1, wherein the printing predictive model is built based on the machine learning by determining the electric field distribution between the nozzle and the impact point in consideration of viscosity of ink, electrical conductivity of ink, the size of the nozzle, and a space information including a distance between the nozzle and the 3D surface, performing printing by checking a flight trajectory of a droplet according to the quantity of electric charges the droplet has, and comparing the printing with a pattern desired to be finally printed.

4. The printing apparatus of claim 1, wherein the printing apparatus comprises an electrohydrodynamic (EHD) printing apparatus or a hybrid printing apparatus using an EHD method.

5. The printing apparatus of claim 1, wherein the printing apparatus uses at least one of a piezoelectric method, a thermal driving method, or a pneumatic method to generate a droplet.

6. The printing apparatus of claim 1, wherein the electrode has at least one of a circular ring shape, a quadrangular shape, or an annular shape separated to surround the nozzle which is formed with a hole through which a droplet ejected from the nozzle passes.

7. The printing apparatus of claim 1, wherein the electrode is disposed below an end surface of the nozzle.

8. The printing apparatus of claim 1, wherein the electrode is deposited on an end surface of the nozzle.

9. The printing apparatus of claim 1, wherein the electrode is disposed inside the nozzle or inside an ink chamber in which ink is stored.

10. The printing apparatus of claim 2, wherein variables for building the printing predictive model by the machine learning comprise a value obtained by experiments, or a value obtained by simulation.

11. The printing apparatus of claim 2, wherein variables for building the printing predictive model by the machine learning comprise at least one of an input voltage for forming the electric field, an impact point of a droplet according to a 3D shape, an impact path, a distance between a nozzle tip and the impact point, the quantity of electric charges the droplet has, an electric field distribution between the nozzle and the impact point, a material of the impact point, or an ejecting direction of the nozzle.

12. The printing apparatus of claim 1, wherein the printing conditions comprises at least one of a distance between the nozzle and the impact point, an ejecting direction of the nozzle, an ejection speed of the droplet, or the quantity of electric charges the droplet has.

13. The printing apparatus of claim 1, wherein the storage is configured to store 3D shape information or material information about a printing target surface.

14. The printing apparatus of claim 1, wherein the sensor comprises an optical unit configured to capture a periphery of the impact point.

15. The printing apparatus of claim 1, wherein the controller is configured to control the ejecting of droplet through the nozzle to form a 3D structure by repeating printing in multi-layers.

16. The printing apparatus of claim 15, wherein the 3D structure is formed with multi-materials, wherein the controller is configured to control the ejecting of droplet through the nozzle while changing in real time the printing conditions in consideration of change in the electric field due to the materials.

* * * * *